United States Patent [19]

Matsuda

[11] Patent Number: 6,017,101
[45] Date of Patent: Jan. 25, 2000

[54] BRAKING FORCE CONTROL SYSTEM IN VEHICLE

[75] Inventor: Shohei Matsuda, Wako, Japan

[73] Assignee: Honda Giken Kogyo Kabushiki Kaisha, Tokyo, Japan

[21] Appl. No.: 08/752,951

[22] Filed: Nov. 20, 1996

[30] Foreign Application Priority Data

Nov. 20, 1995 [JP] Japan .................................. 7-301689

[51] Int. Cl.$^7$ ...................................................... B60T 8/32
[52] U.S. Cl. .......................... 303/140; 303/146; 303/193; 180/197; 180/169; 701/48; 701/70; 701/72
[58] Field of Search ..................................... 303/121, 125, 303/135, 140, 146–148, 193; 180/169, 170, 197, 167; 701/70, 72, 71, 73, 41, 78, 82, 48

[56] References Cited

U.S. PATENT DOCUMENTS 5,172,961  12/1992  Inoue et al. ............................. 303/146
5,529,138  6/1996  Shaw et al. ............................. 180/169

Primary Examiner—Douglas C. Butler
Attorney, Agent, or Firm—Nikaido, Marmelstein, Murray & Oram LLP

[57] ABSTRACT

If a driver's sudden operation of a steering handle to avoid an obstacle is detected based on outputs from a steering speed sensor ($S_1$), a steering torque sensor ($S_2$) and/or a steering torque variation amount sensor ($S_7$), a master cylinder produces a braking hydraulic pressure by a command from an electronic control unit without depression of brake pedal by a driver. A hydraulic pressure control device (4) transmits the braking hydraulic pressure to brake calipers of inner wheels during turning of the vehicle to brake the inner wheels. This causes a yaw moment to be generated so as to turn the direction of advancement of the vehicle to an inward in a turning direction. Thus, the steering operation can be assisted by such yaw moment to avoid the obstacle.

20 Claims, 10 Drawing Sheets

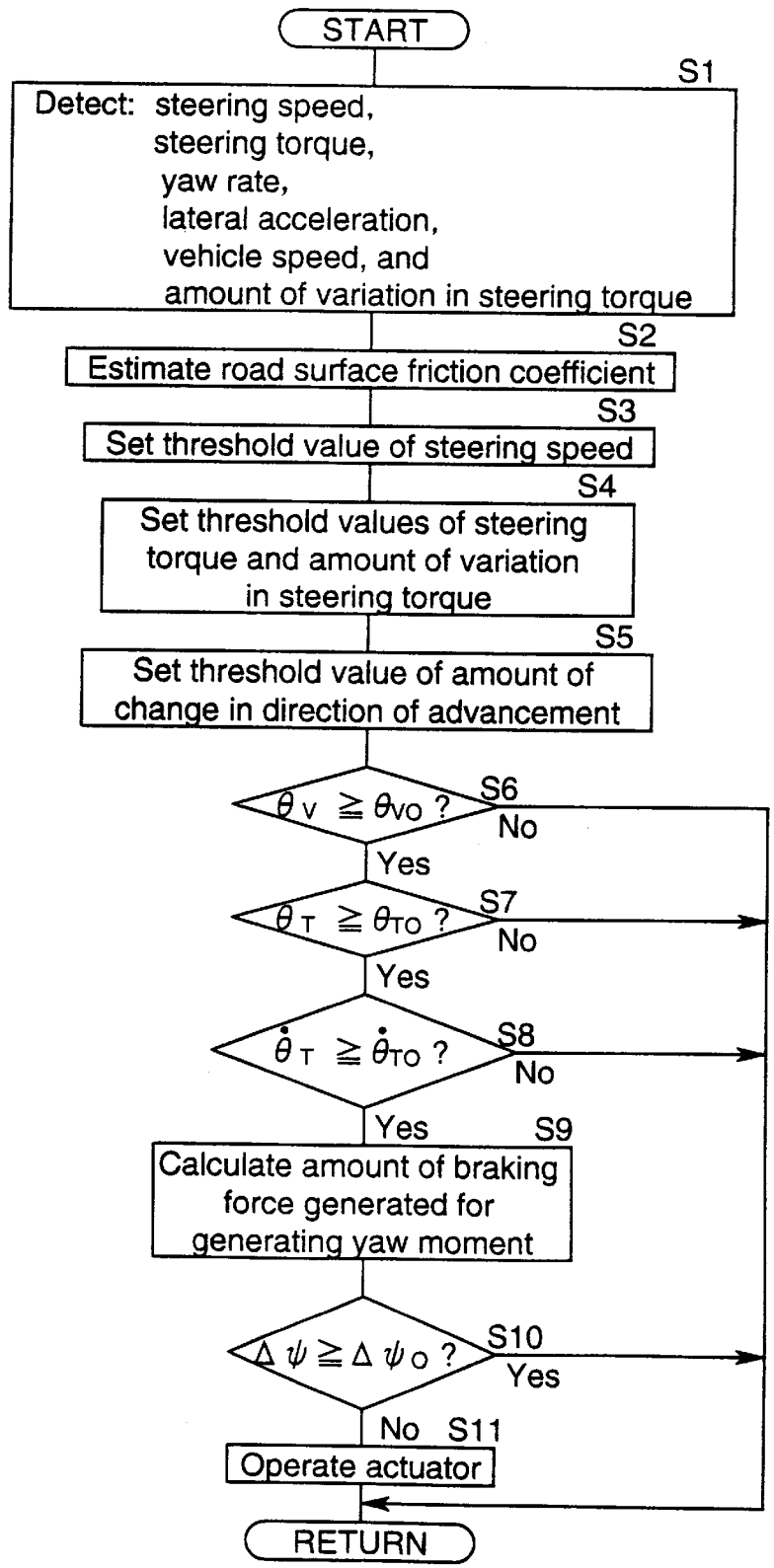

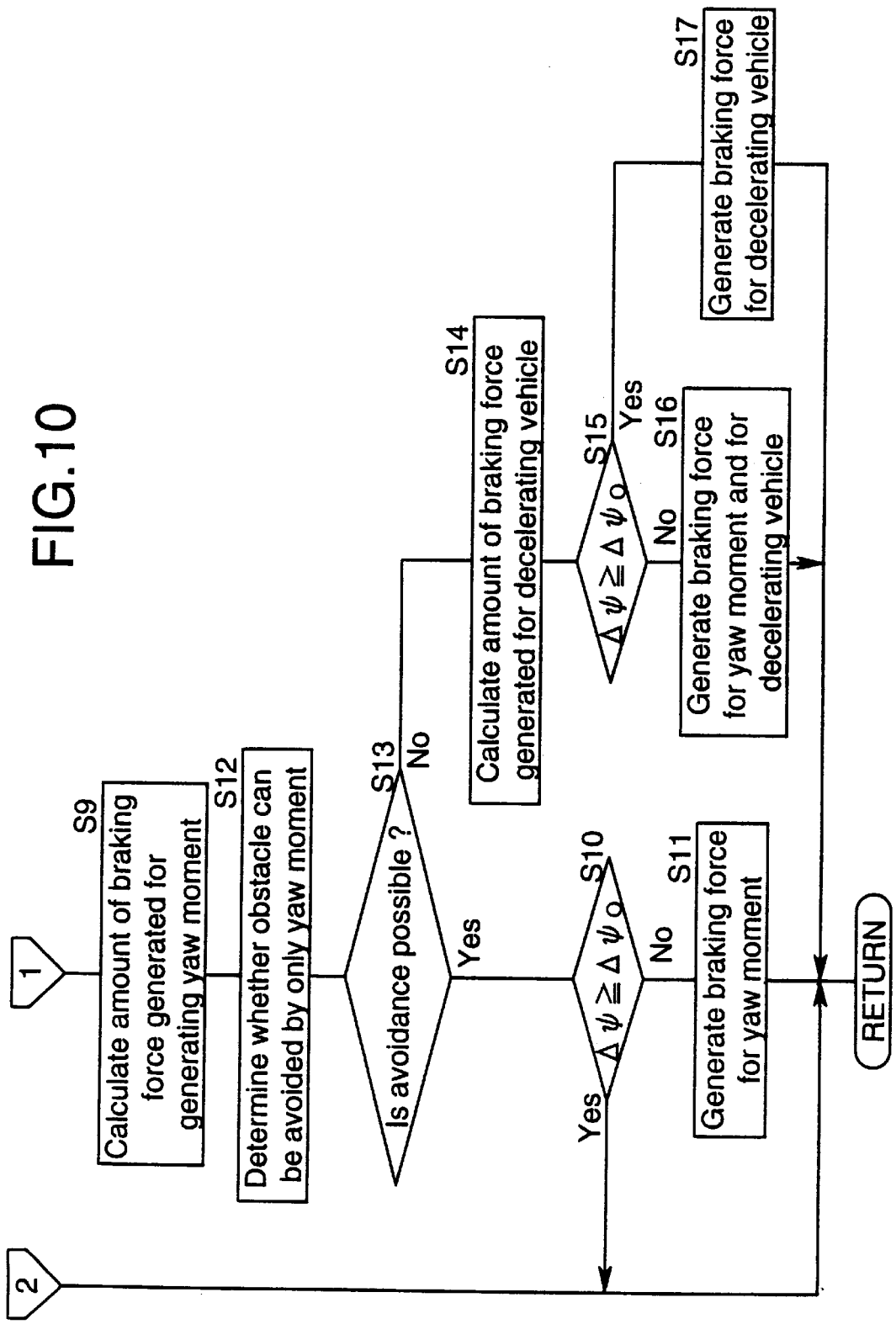

BRAKING FORCE CONTROL SYSTEM IN VEHICLE

BACKGROUND OF THE INVENTION

1. Field of the Invention

The present invention relates to a braking force control system in a vehicle including wheel brakes mounted on left and right wheels, respectively, an actuator capable of individually operating the wheel brake for the left wheel and the wheel brake for the right wheel, and an actuator control means capable of controlling the actuator independently from the braking operation conducted by a driver.

2. Description of the Related Art

In order that a traveling vehicle reliably avoids an obstacle ahead of the vehicle, it is necessary to swiftly change the direction of advancement of the vehicle. For this purpose, it is conventionally required to enhance the responsiveness of a power steering device. In addition, there is a proposed technique which produces a restoring yaw moment in the vehicle by providing different braking forces to the left and right wheels when a spinning or a side-slipping is about to be generated near a limit of motion of the vehicle, thereby avoiding the generation of the spinning or the side-slipping.

However, to change the direction of advancement of the vehicle by the steering operation only, there is a limit due to a speed of steering operation conducted by the driver and a cornering force capable of being generated by a tire. The technique which produces yaw moment in the vehicle by providing the braking forces to the left and right wheels is intended to avoid the generation of the spinning or the side-slipping and not to assist the driver's steering operation to quickly change the direction of advancement of the vehicle.

SUMMARY OF THE INVENTION

Accordingly, it is an object of the present invention to provide a braking force control system in a vehicle, in which when the driver has conducted the steering operation for avoiding the obstacle or the like, the direction of advancement of the vehicle can be changed quickly by utilizing braking forces for the wheels.

To achieve the above object, according to a first aspect and feature of the present invention, there is provided a braking force control system in a vehicle including wheel brakes mounted on left and right wheels, respectively, an actuator capable of individually operating the wheel brake for the left wheel and the wheel brake for the right wheel, and an actuator control means capable of controlling the actuator independently from the braking operation conducted by a driver of the vehicle, wherein the braking force control system includes an urgent avoidance steering-operation detecting means for detecting an urgent avoidance steering-operation by the driver, and when the urgent avoidance steering-operation is detected, the actuator control means controls the actuator to generate a change in the direction of advancement of the vehicle to a direction of the steering operation by using braking forces of the wheels.

With the first feature of the present invention, an obstacle which is difficult to be avoided by the steering operation only can reliably be avoided by assisting the steering operation by a yaw moment generated by the braking force.

According to a second aspect and feature of the present invention, in addition to the first feature, said urgent avoiding steering-operation detecting means detects the urgent avoiding steering-operation when the steering speed is equal to or greater than a threshold value, when the steering torque is equal to or greater than a threshold value and/or when the amount of variation in steering torque is equal to or greater than a threshold value.

With the second feature of the present invention, it is possible to reliably detect the driver's urgent avoiding steering-operation.

According to a third aspect and feature of the present invention, in addition to the first feature, said actuator control means finishes the control of said actuator for generating the variation in the direction of advancement of the vehicle when the amount of variation in the direction of advancement of the vehicle reaches a threshold value.

With the third feature of the present invention, the direction of advancement of the vehicle is prevented from being excessively changed by the braking force for assisting the steering operation.

According to a fourth aspect and feature of the present invention, in addition to the second feature, the braking force control system further includes a road surface friction coefficient detecting means for detecting a road surface friction coefficient, and said threshold value of the steering torque and/or said threshold value of the amount of variation in steering torque is/are increased in accordance with an increase in road surface friction coefficient.

With the fourth feature of the present invention, during traveling of the vehicle on a low friction coefficient road making it difficult to avoid an obstacle, the assisting of the steering operation by the braking force can be started by inputting of a small steering torque and/or a small amount of variation in steering torque to reliably achieve the avoidance of the obstacle.

According to a fifth aspect and feature of the present invention, in addition to the second feature, the braking force control system further includes a vehicle speed detecting means for detecting a vehicle speed, and said threshold value of the steering torque and/or said threshold value of the amount of variation in steering torque is/are decreased in accordance with an increase in vehicle speed.

With the fifth feature of the present invention, during traveling of the vehicle at a high speed in which it is difficult to avoid an obstacle, the assisting of the steering operation by the braking force can be started by inputting a small steering torque and/or a small amount of variation in steering torque to reliably avoid the obstacle.

According to a sixth aspect and feature of the present invention, in addition to the first feature, the braking force control system further includes a road surface friction coefficient detecting means for detecting a road surface friction coefficient, and the braking forces of the wheel brakes for generating the change in direction of advancement of the vehicle is increased in accordance with an increase in road surface friction coefficient.

With the sixth feature, during traveling of the vehicle on a high friction coefficient road in which it is difficult to produce a spinning or a side-slipping of the vehicle, a greater yaw moment can be generated by a greater braking force to reliably achieve the avoidance of the obstacle.

According to a seventh aspect and feature of the present invention, in addition to the first feature, the braking force control system further includes a vehicle speed detecting means for detecting a vehicle speed, and the braking forces of the wheel brakes for generating the change in the direction of advancement of the vehicle are decreased in accordance with an increase in vehicle speed.

With the seventh feature of the present invention, during traveling of the vehicle at a low speed in which it is difficult to produce a spinning or a side-slipping of the vehicle, a greater yaw moment can be generated by a greater braking force to reliably achieve the avoidance of an obstacle.

According to an eighth aspect and feature of the present invention, in addition to the first feature, the braking force control system further includes an obstacle information detecting means for detecting an obstacle present ahead of the vehicle in a direction of advancement thereof, and an obstacle avoidance determining means for determining whether the obstacle can be avoided by the change in the direction of advancement of the vehicle by the braking forces of said wheel brakes based on the result of said detection by said obstacle information detecting means, whereby when said obstacle avoidance determining means determines that the obstacle can not be avoided, said actuator control means controls said actuator to generate a braking force for reducing the vehicle speed.

With the eighth feature of the present invention, when it is difficult to avoid the obstacle by only the braking force for assisting the steering operation, the braking force for decelerating the vehicle can be generated in combination with the braking force for assisting the steering operation to further reliably avoid the obstacle.

The above and other objects, features and advantages of the invention will become apparent from the following description of preferred embodiments taken in conjunction with the accompanying drawings.

BRIEF DESCRIPTION OF THE DRAWINGS

FIG. 4 is a flowchart for explaining the operation;

FIG. 10 is a second portion of the flowchart for explaining the operation of the second embodiment.

DETAILED DESCRIPTION OF THE PREFERRED EMBODIMENTS

The present invention will now be described by way of preferred embodiments with reference to the accompanying drawings.

Figure 1:
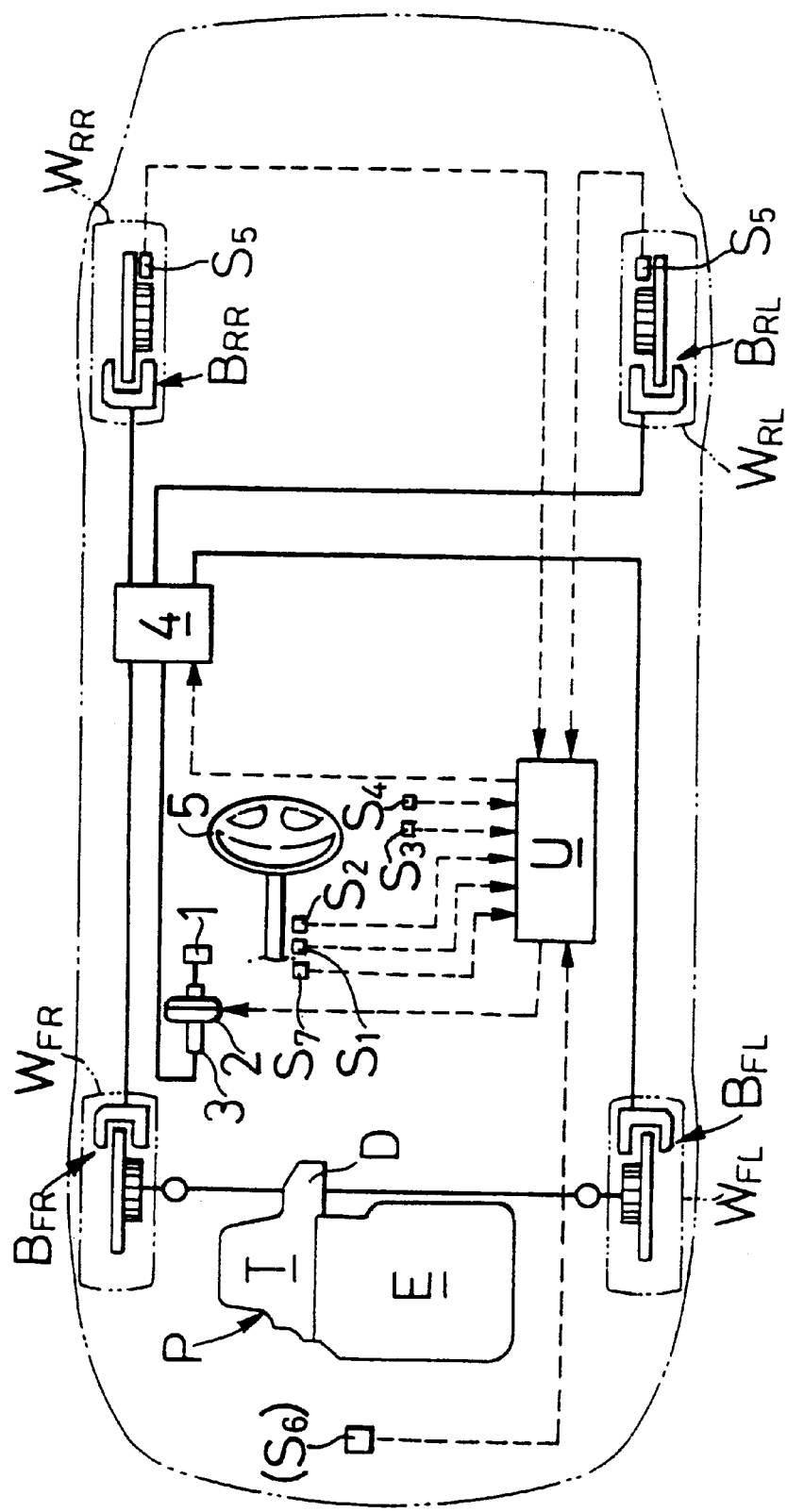
FIG. 1 is a diagrammatic illustration of the entire arrangement of a vehicle including a braking force control system according to a first embodiment of the present invention.

Referring to FIG. 1, a vehicle is equipped with a power unit P integrally provided with an engine E, a transmission T and a differential D. The vehicle includes left and right front wheels $W_{FL}$ and $W_{FR}$ which are driven wheels connected to the power unit P, and left and right rear wheels $W_{RL}$ and $W_{RR}$ which are follower wheels. Brake calipers $B_{FL}$ and $B_{FR}$ are mounted on the left and right front wheels $W_{FL}$ and $W_{FR}$, respectively, and brake calipers $B_{RL}$ and $B_{RR}$ are mounted on the left and right rear wheels $W_{RL}$ and $W_{RR}$, respectively. A master cylinder 3 is connected to the brake calipers $B_{FL}$, $B_{FR}$, $B_{RL}$ and $B_{RR}$ through a hydraulic pressure control means 4 and operated by a vacuum booster 2 connected to a brake pedal 1. The vacuum booster 2 is not only operated by a depression force applied to the brake pedal 1, but also operated by a command from an electronic control unit U (which will be described hereinafter) to generate a hydraulic braking pressure in the master cylinder 3.

A steering wheel 5 is provided with a steering speed sensor $S_1$ for detecting a steering speed $\theta_V$, a steering torque sensor $S_2$ for detecting a steering torque $\theta_T$, and a steering torque variation amount sensor $S_7$ for detecting an amount $d\theta_T/dt$ of variation in steering torque. The steering torque variation amount sensor $S_7$ detects an amount $d\theta_T/dt$ of variation in steering torque based on a time differentiation value of the steering torque $\theta_T$ detected by the steering torque sensor $S_2$. Mounted at place on a vehicle body are a yaw rate sensor $S_3$ for detecting a yaw rate $d\psi/dt$, and a lateral acceleration sensor $S_4$ for detecting a lateral acceleration G. Further, vehicle speed sensors $S_5$, $S_5$ for detecting a vehicle speed V are mounted on the left and right rear wheels $W_{RL}$ and $W_{RR}$ which are the follower wheels. Reference character $S_6$ is a forward monitoring sensor comprised of a radar sensor or a CCD camera. The forward monitoring sensor $S_6$ is used in a second embodiment which will be described hereinafter.

The electronic control unit U calculates signals input from the sensors $S_1$ to $S_7$ based on a predetermined program, and controls the operations of the brake calipers $B_{FL}$, $B_{RR}$, $B_{FR}$ and $B_{RL}$ through the vacuum booster 2 and the hydraulic pressure control unit 4 to generate a yaw moment which assists the turning of the vehicle. The vacuum booster 2 and the hydraulic pressure control unit 4 constitutes an actuator according to the present invention.

Figure 2:
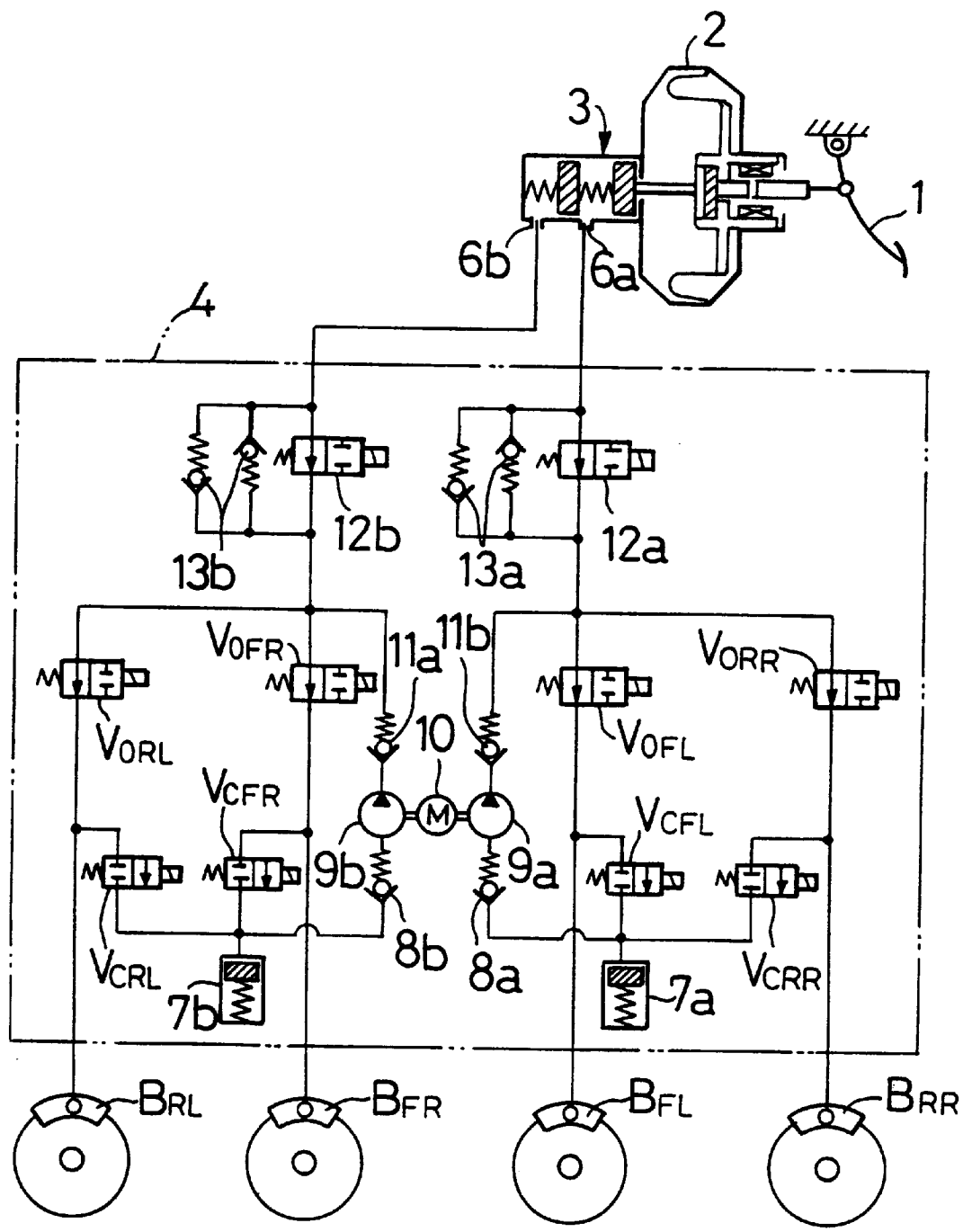
FIG. 2 is an illustration of a hydraulic pressure circuit of a braking system.

As shown in FIG. 2, the master cylinder 3 includes two output ports 6a and 6b. The first output port 6a is connected to the brake caliper $B_{FL}$ of the left front wheel $W_{FL}$ and the brake caliper $B_{RR}$ of the right rear wheel $W_{RR}$ through the hydraulic pressure control unit 4, and the second output port 6b is connected to the brake caliper $B_{FR}$ of the right front wheel $W_{FR}$ and the brake caliper $B_{RL}$ of the left rear wheel $W_{RL}$ through the hydraulic pressure control unit 4.

The hydraulic pressure control means 4 includes four normally-opened solenoid valves $V_{OFL}$, $V_{ORR}$, $V_{OFR}$ and $V_{ORL}$ individually corresponding to the brake calipers $B_{FL}$, $B_{RR}$, $B_{FR}$ and $B_{RL}$, four normally-closed solenoid valves $V_{CFL}$, $V_{CRR}$, $V_{CFR}$ and $V_{CRL}$ individually corresponding to the brake calipers $B_{FL}$, $B_{RR}$, $B_{FR}$ and $B_{RL}$, a pair of reservoirs 7a and 7b individually corresponding to the brake calipers $B_{FL}$ and $B_{RR}$ of the left front wheel $W_{FL}$ and the right rear wheel $W_{RR}$ and the brake calipers $B_{FR}$ and $B_{RL}$ of the right front wheel $W_{FR}$ and the left rear wheel $W_{RL}$, respectively, a pair of return pumps 9a and 9b connected to the reservoirs 7a and 7b through intake valves 8a and 8b, respectively, a motor 10 common to both the return pumps 9a and 9b, and discharge valves 11a and 11b incorporated in oil passages connecting the return pumps 9a and 9b to the normally-opened solenoid valves $V_{OFL}$, $V_{ORR}$, $V_{OFR}$ and $V_{ORL}$ and normally-opened solenoid valves 12a and 12b. The normally-opened solenoid valve 12a is interposed between the output port 6a of the master cylinder 3 and the two normally-opened solenoid valves $V_{OFL}$ and $V_{ORR}$, and the normally-opened solenoid valve 12b is interposed between the output port 6b of the master cylinder 3 and the two normally-opened solenoid valves $V_{OFR}$ and $VORL$. The hydraulic pressure control means 4 further includes double check valves 13a and 13b mounted in parallel to the normally-opened solenoid valves 12a and 12b and opened by a predetermined opening pressure.

The normally-opened solenoid valve $V_{OFL}$ is incorporated between the output port 6b of the master cylinder 3 and the brake caliper $B_{FL}$ Of the left front wheel $W_{FL}$, and the normally-opened solenoid valve $V_{ORR}$ is incorporated between the output port 6a and the brake caliper $B_{RR}$ Of the right rear wheel $W_{RR}$. The normally-opened solenoid valve $V_{OFR}$ is incorporated between the output port 6b of the master cylinder 3 and the brake caliper $B_{FR}$ of the right front wheel $W_{FR}$, and the normally-opened solenoid valve $V_{ORL}$ is incorporated between the output port 6b and the brake caliper $B_{RL}$ of the left rear wheel $W_{RL}$.

The normally-closed solenoid valve $V_{CFL}$ is incorporated between the brake caliper $B_{FL}$ of the left front wheel $W_{FL}$ and the reservoir 7a, and the normally-closed solenoid valve $V_{ORR}$ is incorporated between the brake caliper $B_{RR}$ of the right rear wheel $W_{RR}$ and the reservoir 7a. The normally-closed solenoid valve $V_{CFR}$ is incorporated between the brake caliper $B_{FR}$ of the right front wheel $W_{FR}$ and the reservoir 7b, and the normally-closed solenoid valve $V_{CRL}$ is incorporated between the brake caliper $B_{RL}$ of the left rear wheel $W_{RL}$ and the reservoir 7b.

The electronic control unit U controls the opening and closing of the normally-opened solenoid valves $V_{OFL}$, $V_{ORR}$, $V_{OFR}$, $V_{ORL}$, 12a and 12b and the normally-closed solenoid valves $V_{CFL}$, $V_{CRR}$, $V_{CFR}$ and $V_{CRL}$, and controls the operation of the vacuum booster 2 independently from the operation of the brake pedal by a driver, thereby exhibiting a well-known antilock brake function and assisting the driver's steering operation to promptly change the direction of advancement of the vehicle.

The hydraulic pressure control means 4 having the above-described arrangement has an antilock brake function. The outline of the antilock brake function will be described below.

If the wheel is about to be fallen into a locked state during braking, the normally-opened solenoid valve 12a, 12b is energized and closed, thereby making it difficult for the pulsing of the hydraulic braking pressure directed to the brake caliper $B_{FL}$, $B_{RR}$ to be transmitted as a reaction force to the brake pedal 1 during the antilock brake control. Then, when one of the normally-opened solenoid valves $V_{OFL}$, $V_{ORR}$, $V_{OFR}$ and $V_{CRL}$ which corresponds to the wheel about to be fallen into the locked state is energized and closed, and one of the normally-closed solenoid valves $V_{CFL}$, $V_{CRR}$, $V_{CFR}$ and $V_{CRL}$ which corresponds to the wheel about to be fallen into the locked state is energized and opened, a portion of the hydraulic braking pressure is released to the reservoir 7a or 7b, whereby a reduction in pressure is achieved. To maintain the hydraulic braking pressure, the normally-opened solenoid valves $V_{OFL}$, $V_{ORR}$, $V_{OFR}$ and $V_{ORL}$ maybe energized and closed, and at the same time, the normally-closed solenoid valves $V_{CFL}$, $V_{CRR}$, $V_{CFR}$ and $V_{CRL}$ may be deenergized and maintained in their closed states. To increase the hydraulic braking pressure, the normally-opened solenoid valves $V_{OFL}$, $V_{ORR}$, $V_{OFR}$ and $V_{ORL}$ may be deenergized and opened, and at the same time, the normally-closed solenoid valves $V_{CFL}$, $V_{CRR}$, $V_{CFR}$ and $V_{CRL}$ may be deenergized and maintained in their closed states.

The motor 10 for commonly driving the pair of return pumps 9a and 9b is operated during the antilock brake control, so that the working oil escaped to the reservoir 7a or 7b is returned from the return pump 9a or 9b to an upstream of the normally-opened solenoid valve $V_{OFL}$, $V_{ORR}$, $V_{OFR}$, $V_{ORL}$. Therefore, the amount of brake pedal depressed in the master cylinder 3 cannot be increased by the amount of the working oil escaped to the reservoir 7a or 7b.

Figure 3:
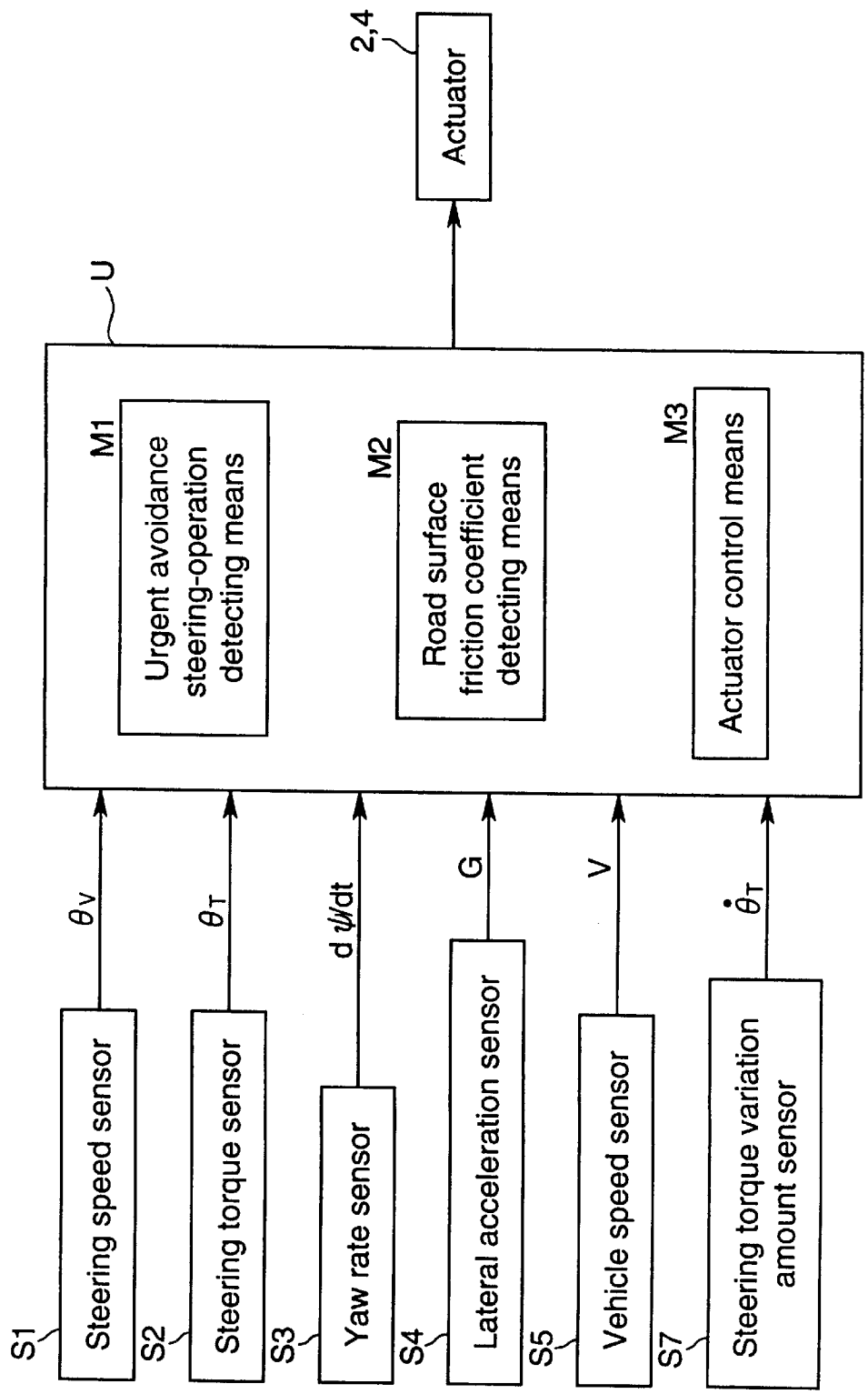
FIG. 3 is a block diagram of a control section.

As shown in FIG. 3, the electronic control unit U, to which the signals from the steering speed sensor $S_1$, the steering torque sensor $S_2$, the yaw rate sensor $S_3$, the lateral acceleration sensor $S_4$, the vehicle speed sensors $S_5$ and $S_5$ and the steering torque variation amount sensor $S_7$ are input, includes an urgent avoidance steering-operation detecting means M1, for detecting the driver's urgent operation of the steering wheel 5 to avoid an obstacle ahead of the subject vehicle, a road surface friction coefficient detecting means M2 for estimating a road surface friction coefficient $\mu$, and an actuator control means M3 for controlling the actuator comprised of the vacuum booster 2 and the hydraulic pressure control means 4.

The operation of the present invention having the above-described arrangement will be described below mainly with reference to a flowchart in FIG. 4.

First, at step S1, a steering speed $\theta_V$, a steering torque $\theta_T$, a yaw rate $d\psi/dt$, a lateral acceleration G, a vehicle speed V and an amount $d\theta_T/dt$ of variation in steering torque are detected based on outputs from the steering speed sensor $S_1$, the steering torque sensor $S_2$, the yaw rate sensor $S_3$, the lateral acceleration sensor $S_4$, the vehicle speed sensors $S_5$ and $S_4$ and the steering torque variation amount sensor $S_7$.

Then, at step $S_2$, a road surface friction coefficient $\mu$ is estimated by the road surface friction coefficient detecting means M2 of the electronic control unit U. There are several methods for estimating the road surface friction coefficient $\mu$, and a common method is to estimate from a longitudinal acceleration of the vehicle. But in this embodiment, the road surface friction coefficient $\mu$ is estimated using an electric power steering device.

Figure 5A:
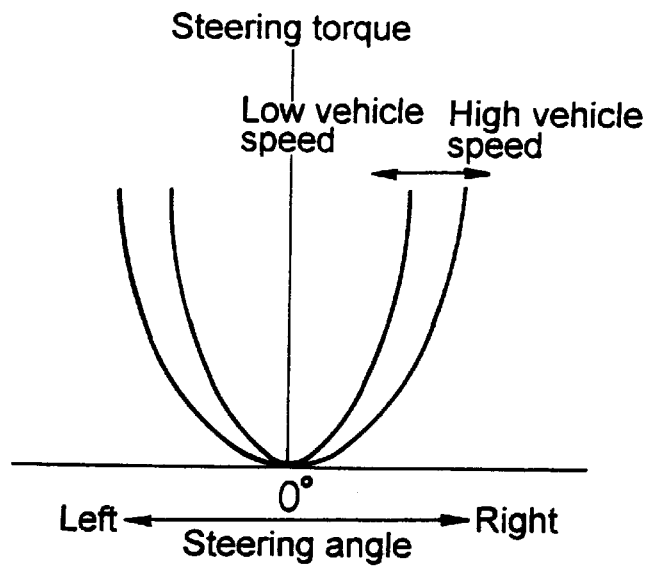
FIGS. 5A and 5B are graphs for explaining a procedure of estimating a road surface friction coefficient.
Figure 5B:
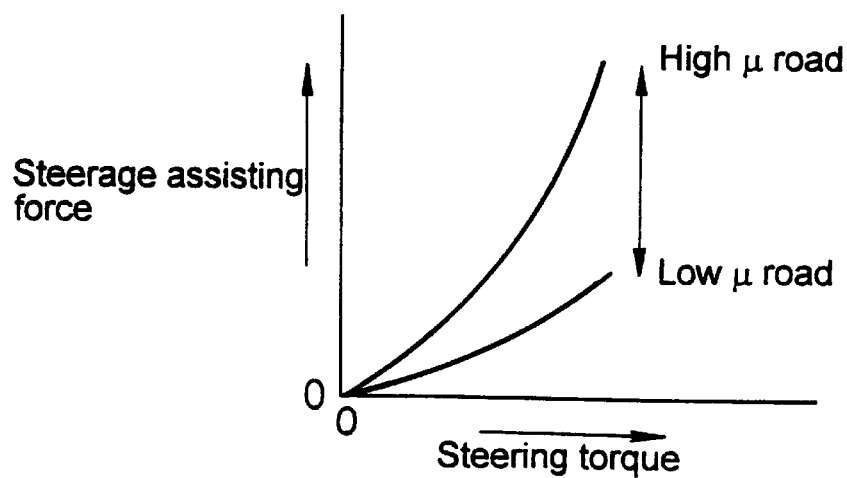

More specifically, a proper steering torque is set in the electric power steering device in accordance with the vehicle speed and the steering angle, and an actuator motor for the electric power steering device generates an steerage assisting force, so that such steering torque is produced (see FIG. 5A). At this time, the required steerage assisting force is varied in accordance with the road surface friction coefficient $\mu$. On a high friction coefficient road with a great friction force to the tire, the steerage assisting force is great, and on low friction coefficient road with a smaller friction force to the tire, the steerage assisting force is smaller (see FIG. 5B). Therefore, the road surface friction coefficient $\mu$ can be estimated from the magnitude of a steerage assisting force required to provide the preset steering torque.

Figure 6A:
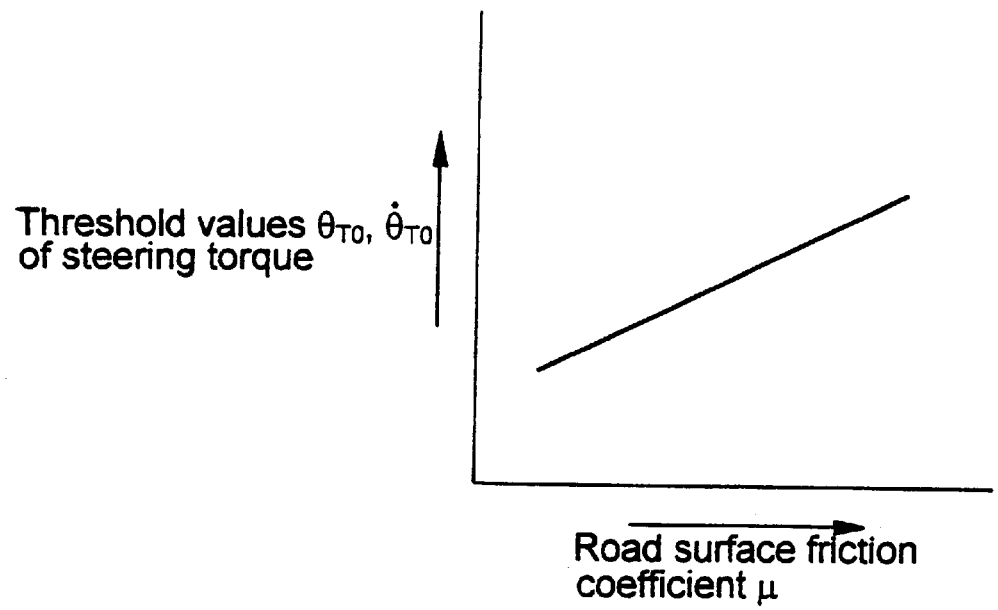
FIGS. 6A and 6B are graphs for determining threshold values of a steering torque and an amount of variation in steering torque.
Figure 6B:
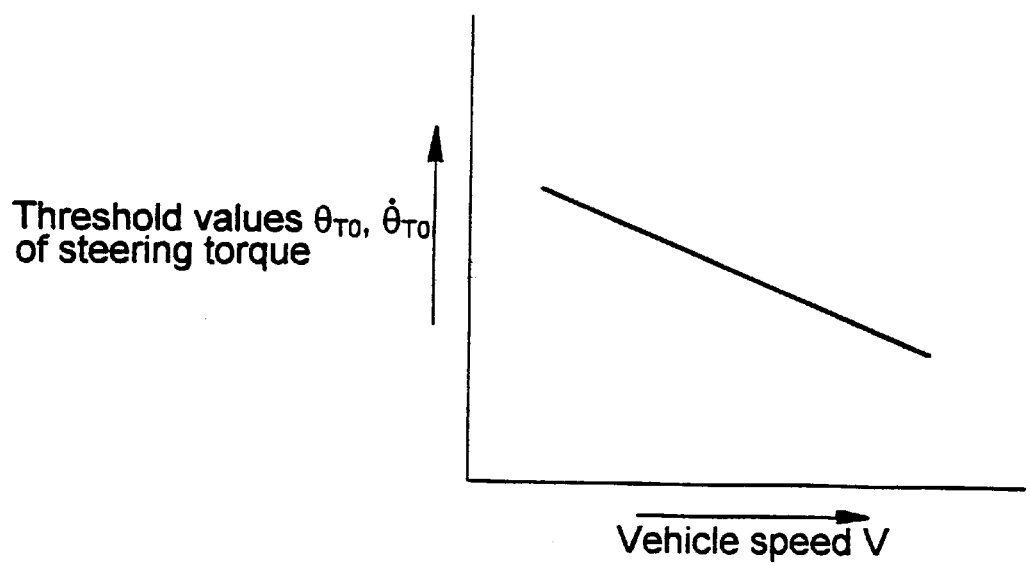

Subsequent steps S3 to S8 and step S10 are carried out in the urgent avoiding steering operation detecting means M1 of the electronic control unit U. A threshold value $\theta_{VO}$ of the steering speed, a threshold value $\theta_{TO}$ of the steering torque and a threshold value $[d\theta_T/dt]_O$ of an mount of variation in steering torque for starting the assisting of the steering operation by a braking force are set at step S3 and at step S4. The threshold value $\theta_{VO}$ of the steering speed is set as a fixed value in this embodiment. The threshold value $\theta_{TO}$ of the steering torque and a threshold value $[d\theta_T/dt]_O$ of an amount of variation in steering torque are variable values, and are set so that they are increased in accordance with an increase in road surface friction coefficient $\mu$ estimated at step S2, as shown in FIG. 6A and decreased in accordance with an increase in vehicle speed detected by the vehicle speed sensors $S_5$, $S_5$, as shown in FIG. 6B.

Thus, during traveling of the vehicle on a low friction coefficient road or during traveling of the vehicle at a higher speed in which it is difficult avoid an obstacle, the assisting by the braking force is started even if a smaller steering torque $\theta_T$ or a smaller amount $d\theta_T/dt$ of variation in steering torque is input, whereby the avoidance of the obstacle can reliably be performed.

At subsequent step S5, a threshold value $\Delta\psi_O$ of an amount of variation $\Delta\psi$ in a direction of advancement for finishing the assisting by the braking force is set. The threshold value $\Delta\psi_O$ of an amount of variation $\Delta\psi$ in a direction of advancement is provided by integrating the yaw rate $d\psi/dt$ detected by the yaw rate sensor $S_3$ by a predetermined time, and the threshold value $\Delta\psi_O$ is set as a fixed value in this embodiment.

It is determined that the driver has operated the steering wheel 5 quickly in order to avoid the obstacle, if the following three conditions 1) to 3) are satisfied at steps S6 to S8: 1) the steering speed $\theta_O$ detected by the steering speed sensor $S_1$ is equal to or greater than the threshold value $\theta_{VO}$ set at step S3; 2) the steep torque $\theta_T$ detected by the steering torque sensor $S_2$ is equal to or greater than the threshold value $\theta_{VO}$ set at step S4; and 3) the amount $d\theta_T/dt$ of variation in steering torque detected by the steering torque variation amount sensor $S_7$ is equal to or greater than the threshold value $d\theta_T/dt$ set at step S4. At step S9, the actuator control means M3 of the electronic control unit U calculates an amount of braking force generation for assisting the steering operation, i.e., the magnitude of a yaw rate generated in the vehicle by the braking.

The amount of braking force generated is determined basically in accordance with the magnitude of the steering torque $\theta_T$. In the electric power steering device, a quantity of electricity applied to the actuator motor is determined at least in accordance with the magnitude of the steering torque $\theta_T$. If the amount of braking force generated is controlled based on the quantity of electricity, an algorithm for calculating the amount of braking force generated from the steering torque $\theta_T$ can be used commonly with that in the electric power steering device.

Figure 7A:
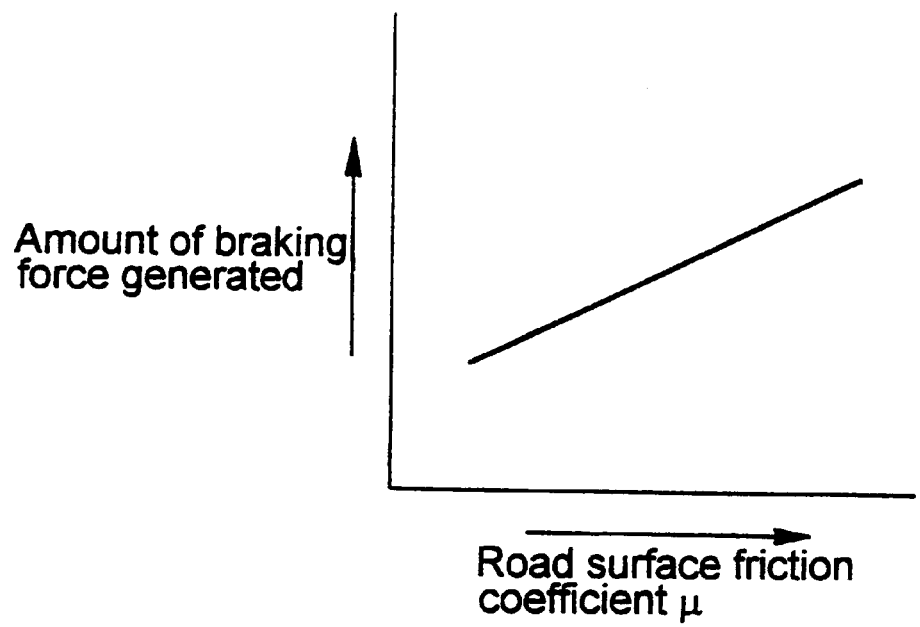
FIGS. 7A and 7B are graphs for determining an amount of braking force generated.
Figure 7B:
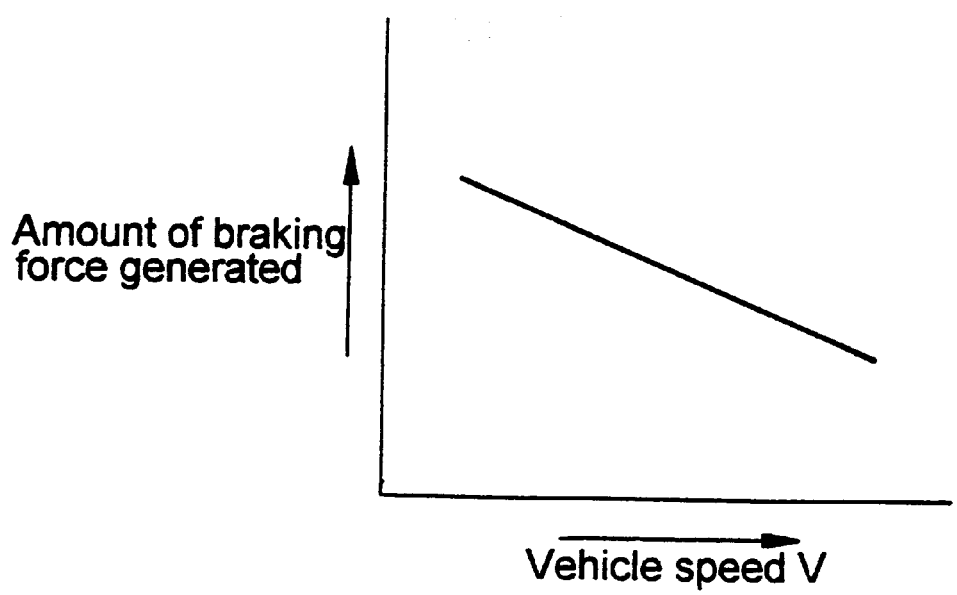

The amount of braking force generated is corrected in accordance with the road surface coefficient $\mu$ and the vehicle speed V. More specifically, the amount of braking force generated is increased with an increase in road surface friction coefficient $\mu$, as shown in FIG. 7A and decreased with an increase in vehicle speed V, as shown in FIG. 7B. Thus, during traveling of the vehicle which is liable to produce a spinning or a side-slipping, or during traveling of the vehicle at a lower speed, greater yaw moment can be generated by a greater braking force to reliably avoid an obstacle.

Until the amount $\Delta\psi$ of variation in the advancing direction will reach the threshold value $\Delta\psi_O$ at step S10, the actuator control means M3 of the electronic control unit U controls the vacuum booster 2 and the hydraulic pressure control means 4 and generates a braking force for assisting the steering operation at step S11. When the amount $\Delta\psi$ of variation in the advancing direction reaches the threshold value $\Delta\psi_O$ at step S10, the generation of the braking force is completed. By defining an upper limit of the amount $\Delta\psi$ of variation in the advancing direction by the threshold value $\Delta\psi_O$ in the above manner, an excessive change in the direction of advancement of the vehicle can be prevented.

The braking force for assisting the steering operation is generated by controlling the vacuum booster 2 and the hydraulic pressure control means 4 constituting the actuator in the following manner:

For example, when the obstacle is to be avoided by operating the steering wheel 5 rightwards, the vacuum booster 2 is operated without depression of the brake pedal 1 by the driver in response to the command from the electronic control unit U, and the master cylinder 3 generates a braking hydraulic pressure corresponding to the amount of braking force generated. At the same time, the normally-opened solenoid valve $V_{OFL}$ corresponding to the left front wheel $W_{FL}$ and mounted in the hydraulic pressure control means 4 and the normally-opened solenoid valve $V_{ORL}$ corresponding to the left rear wheel $W_{RL}$ are closed, and the normally-opened solenoid valve $V_{OFR}$ corresponding to the right front wheel $W_{FR}$ and the normally-opened solenoid valve $V_{ORR}$ corresponding to the right rear wheel $W_{RR}$ are maintained in their opened states. In addition, all of the four normally-closed solenoid valves $V_{CFL}$, $V_{CRR}$, $V_{CFR}$ and $R_{CRL}$ are maintained in their closed states.

As a result, the brake caliper $B_{FR}$ of the right front wheel $W_{FR}$ which is an inner wheel during turning of the vehicle and the brake caliper $B_{RR}$ of the right rear wheel $W_{RR}$ which is also an inner wheel during turning of the vehicle are operated to generate a braking force. Therefore, a clockwise yaw moment causing the vehicle to be turned clockwise is generated, and the clockwise turning of the vehicle caused by the steering handle 5 is assisted by such yaw moment, whereby the vehicle can avoid the obstacle smoothly and reliably. When the amount $\Delta\psi$ of variation in the advancing direction reaches the threshold value $\Delta\psi_O$, the operation of the vacuum booster 2 is stopped, whereby the master cylinder 3 generates no braking hydraulic pressure, and the two normally-opened solenoid valves $V_{OFL}$ and $V_{ORL}$ which are in their closed states are returned to the opened states, thus completing the control.

If it is determined based on the lateral acceleration G detected by the lateral acceleration sensor $S_4$ and the like that a spinning tendency or a side-slipping tendency has been generated in the vehicle, the assisting of the steering operation by the braking force is discontinued and switched over to the control for inhibiting the spinning or the side-slipping by a restoring yaw moment generated by the braking force. With such construction, the vehicle can reliably be restored from a critical state in which the spinning or the side-slipping has been generated to a steady state.

A second embodiment of the present invention will now be described with reference to FIGS. 8 to 10.

Figure 8:
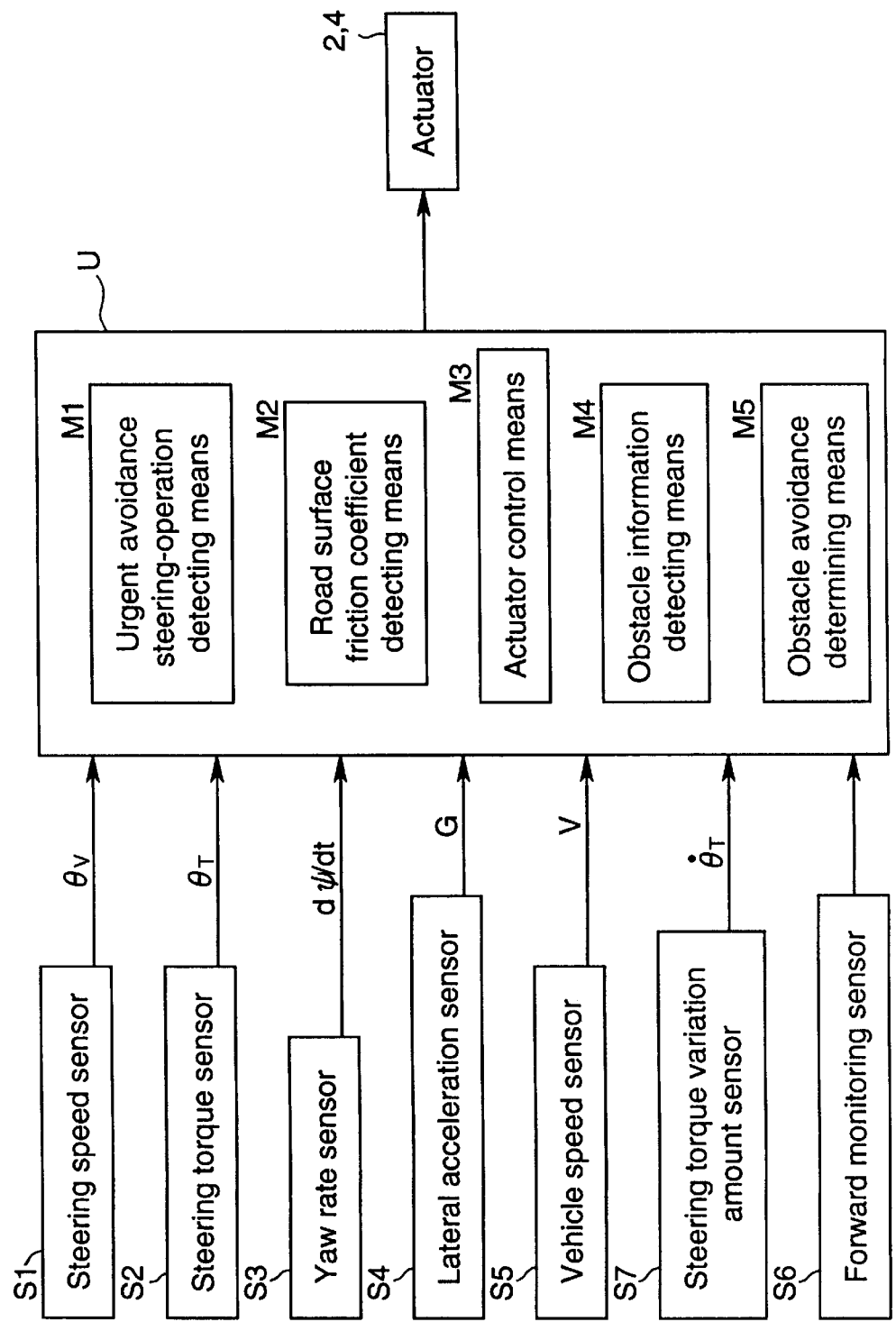
FIG. 8 is a block diagram of a control section according to a second embodiment of the present invention.
Figure 9:
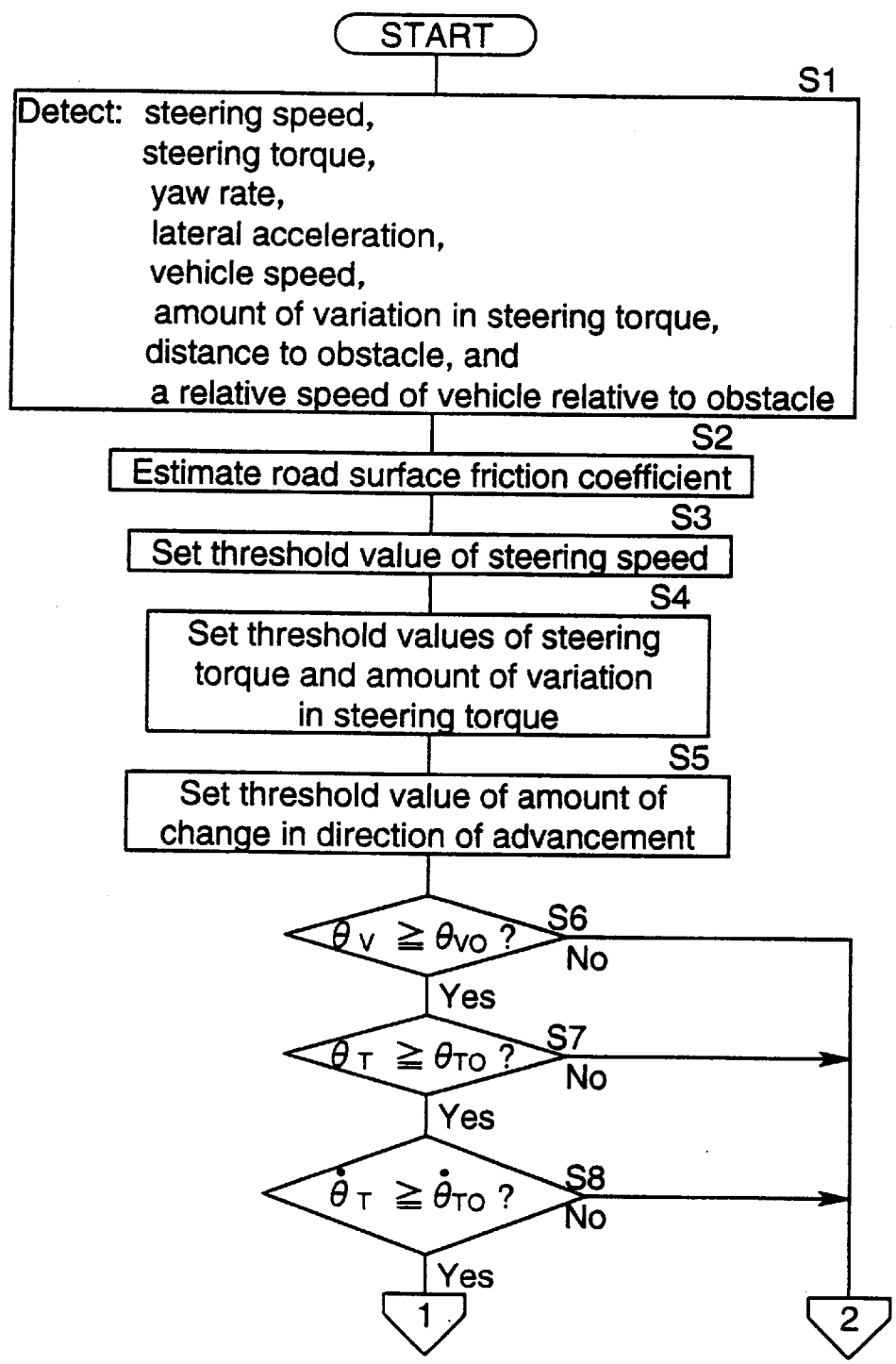
FIG. 9 is a first portion of a flowchart for explaining the operation of the second embodiment.

As shown in FIG. 8, the second embodiment includes a forward monitoring sensor $S_6$ comprised of a radar sensor or a CCD camera, in addition to the steering speed sensor $S_1$, the steering torque sensor $S_2$, the yaw rate sensor $S_3$, the lateral acceleration sensor $S_4$, the vehicle speed sensors $S_5$, $S_5$ and the steering torque variation amount sensor $S_7$ which are used in the first embodiment.

An electronic control unit U in the second embodiment includes an obstacle information detecting means M4 and an obstacle avoidance determining means M5, in addition to the urgent avoiding steering-operation detecting means M1, the road surface friction coefficient detecting means M2 and the actuator control means M3 which are used in the first embodiment. The obstacle information detecting means M4 detects a distance L from the subject vehicle to an obstacle (for example, a vehicle traveling ahead of the subject vehicle) based on an output from the forward monitoring sensor $S_6$, and a relative speed $\Delta V$ of the subject vehicle relative to the obstacle. The obstacle avoidance determining means M5 determines whether it is possible to avoid the obstacle with the yaw moment by the braking force which has been described in the first embodiment.

The operation of the second embodiment will be described below with reference to a flowchart in FIGS. 9 and 10. In the flowchart in FIGS. 9 and 10, steps corresponding to those in the flowchart shown in FIG. 4 are designated by the same step numbers.

First, at step S1, a steering speed $\theta_V$, a steering torque $\theta_T$, a yaw rate $d\psi/dt$, a lateral acceleration G, a vehicle speed V and an amount $d\theta_T/dt$ of variation in steering torque are detected based on outputs from the steering speed sensor $S_1$, the steering torque sensor $S_2$, the yaw rate sensor $S_3$, the lateral acceleration sensor $S_4$, the vehicle speed sensors $S_5$, $S_5$ and the steering torque variation amount sensor $S_7$. Further, a distance L from the subject vehicle to the obstacle and a relative speed $\Delta V$ of the subject vehicle relative to the obstacle are detected in the obstacle information detecting means M4 of the electronic control unit U based on an output from the forward monitoring sensor $S_6$. The subsequent steps S2 to S9 are of the same contents as in the first embodiment, wherein when the urgent avoidance steering-operation has been detected, an amount of braking force generated for avoiding the obstacle is calculated.

At subsequent step S12, it is determined whether the obstacle can be avoided only by the yaw moment generated by the braking force calculated at step S9. If the result of determination is "yes" at step S13, a braking force is generated in an inner wheel during turning of the vehicle as in the first embodiment, and the advancing direction is changed by the resulting yaw moment to perform the avoidance of the obstacle.

On the other hand, if the result of determination is "no" at step S13 to indicate that it is impossible to avoid the obstacle only by the yaw moment generated by the braking force calculated at step S9, an amount of braking force generated for decelerating the vehicle is calculated at step S14. Until the amount $\Delta\psi$ in variation in the advancing direction of the vehicle will reach the threshold value $\Delta\psi_O$ at step S15, the actuator control means M3 of the electronic control unit U controls the vacuum booster 2 and the hydraulic pressure control means 4, thereby simultaneously generating a braking force for assisting the steering operation and a braking force for decelerating the vehicle.

That is, if it is impossible to avoid the obstacle by only the braking force for assisting the steering operation, then the avoidance of the obstacle can be achieved by a sum total of the braking forces by further generating the braking force for decelerating the vehicle. In this case, the braking force for decelerating the vehicle is generated in the inner and outer wheels during turning of the vehicle and in addition to this, the braking force for assisting the steering operation is generated in the inner wheel during turning of the vehicle.

The distribution of the braking force is achieved by transmitting the braking hydraulic pressure output by the master cylinder 3 to the four brake calipers $B_{FL}$, $B_{RR}$, $B_{FR}$ and $B_{RL}$ by the command from the electronic control unit U, while selecting opening the normally-closed solenoid valves $V_{CFL}$, $V_{CRR}$, $V_{CFR}$ and $V_{CRL}$ corresponding to the outer wheels during turning of the vehicle for generating only the braking force for decelerating the vehicle to reduce the braking hydraulic pressure.

When the amount $\Delta\psi$ in variation in the advancing direction of the vehicle has reached the threshold value $\Delta\psi_O$ at step S15, the generation of the braking force for assisting the steering operation is finished at step S17, and only the braking force for decelerating the vehicle is generated.

In this way, if it is difficult to avoid the obstacle by only the braking force for assisting the steering operation, it is possible to reliably avoid the obstacle by generating the braking force for decelerating the vehicle in combination with the braking force for assisting the steering operation.

Although the embodiments of the present invention have been described in detail, it will be understood that the present invention is not limited to the above-described embodiments, and various modifications may be made without departing from the spirit and scope of the invention defined in claims.

For example, in the embodiment, if the steering speed $\theta_V$ is equal to or higher than the threshold value $\theta_{VO}$ at step S6, the steering torque $\theta_T$ is equal to or greater than the threshold value $\theta_{TO}$ at step S7 and the amount $d\theta_T/dt$ of variation in steering torque is equal to or greater than the threshold value $[d\theta_T/dt]_O$ at step S8, it is determined that the driver has rapidly operated the steering wheel 5 in order to avoid the obstacle. However, when any one or two of the conditions of steps S6 to S8 are established, it may be determined that the urgent avoidance steering-operation has been performed. When the braking force is to be generated in the inner wheels during turning of the vehicle, the braking force may be generated in any one of the front and rear inner wheels.

What is claimed is:

1. A braking force control system in a vehicle including wheel brakes mounted on left and right wheels, respectively, an actuator capable of individually operating the wheel brake for the left wheel and the wheel brake for the right wheel, and an actuator control means capable of controlling the actuator independently from a braking operation conducted by a driver of the vehicle, wherein said braking force control system includes an urgent avoidance steering-operation detecting means for detecting an urgent avoidance steering-operation by the driver, and when the urgent avoidance steering-operation is detected, said actuator control means controls said actuator to generate a change in a direction of advancement of the vehicle to a direction of the steering operation by using braking forces of the wheels, wherein said urgent avoidance steering-operation detecting means detects the urgent avoidance steering-operation when at least one of the following conditions is satisfied:
   a steering speed is equal to or greater than a threshold value;
   a steering torque is equal to or greater than a threshold value; and
   an amount of variation in steering torque is equal to or greater than a threshold value.

2. A braking force control system in a vehicle according to claim 1, wherein said actuator control means finishes the control of said actuator for generating the change in the direction of advancement of the vehicle when an amount of the change in the direction of advancement of the vehicle reaches a threshold value.

3. A braking force control system in a vehicle according to claim 1, further including a road surface friction coefficient detecting means for detecting a road surface friction coefficient, and at least one of said threshold value for a steering torque and said threshold value for the amount of variation in steering torque is increased in accordance with an increase in the road surface friction coefficient.

4. A braking force control system in a vehicle according to claim 1, further including a vehicle speed detecting means for detecting a vehicle speed, and at least one of said threshold value for a steering torque and said threshold value for the amount of variation in steering torque is decreased in accordance with an increase in the vehicle speed.

5. A braking force control system in a vehicle according to claim 1, further including a road surface friction coefficient detecting means for detecting a road surface friction coefficient, and the braking forces of the wheel brakes for generating the change in the direction of advancement of the vehicle is increased in accordance with an increase in the road surface friction coefficient.

6. A braking force control system in a vehicle according to claim 1, further including a vehicle speed detecting means for detecting a vehicle speed, and the braking forces of the wheel brakes for generating the change in the direction of advancement of the vehicle are decreased in accordance with an increase in the vehicle speed.

7. A braking force control system in a vehicle including wheel brakes mounted on left and right wheels, respectively, an actuator capable of individually operating the wheel brake for the left wheel and the wheel brake for the right wheel, and an actuator control means capable of controlling the actuator independently from a braking operation conducted by a driver of the vehicle, wherein said braking force control system includes an urgent avoidance steering-operation detecting means for detecting an urgent avoidance steering-operation by the driver, and when the urgent avoidance steering-operation is detected, said actuator control means controls said actuator to generate a change in a direction of advancement of the vehicle to a direction of the steering operation by using braking forces of the wheels,
   said system further including an obstacle information detecting means for detecting an obstacle present ahead of the vehicle in a direction of advancement thereof, and an obstacle avoidance determining means for determining whether the obstacle can be avoided by the change in the direction of advancement of the vehicle by the braking forces of said wheel brakes based on a result of said detection by said obstacle information detecting means, whereby when said obstacle avoidance determining means determines that the obstacle can not be avoided, said actuator control means controls said actuator to generate a braking force for reducing the vehicle speed.

8. A braking force control system in a vehicle comprising:
   an urgent avoidance steering-operation detecting means for detecting an urgent avoidance steering-operation by a driver of the vehicle;
   a plurality of wheels, each said wheel having a wheel brake operatively connected thereto;
   a brake actuator for individually operating each of said wheel brakes;
   an actuator control means coupled to said brake actuator, for controlling said actuator independently from a braking operation of the driver, wherein
   when said urgent avoidance steering-operation is detected, said actuator control means controls said brake actuator to generate a change in direction of advancement of the vehicle to the direction of the urgent avoidance steering-operation by applying braking forces to said wheels, and wherein at least one of the detection of said urgent avoidance steering-operation and the determination of amount of said braking forces is carried out based on a steering torque.

9. A braking force control system in a vehicle according to claim 8, wherein said urgent avoidance steering-operation detecting means detects an urgent avoidance steering-operation when a steering speed is equal to or greater than a threshold value.

10. A braking force control system in a vehicle according to claim 8, wherein said urgent avoidance steering-operation detecting means detects an urgent avoidance steering operation when a steering torque is equal to or greater than a threshold value.

11. A braking force control system in a vehicle according to claim 10, further comprising a road surface friction coefficient detecting means for detecting a road surface friction coefficient, wherein said threshold value of steering torque is increased in accordance with an increase in said road surface friction coefficient.

12. A braking force control system in a vehicle according to claim 10, further comprising a vehicle speed detecting means for detecting a vehicle speed, wherein said threshold value of steering torque is decreased in accordance with an increase in vehicle speed.

13. A braking force control system in a vehicle according to claim 8, wherein said urgent avoidance steering-operation detecting means detects an urgent avoidance steering operation when a time derivative of a steering torque is equal to or greater than a threshold value.

14. A braking force control system in a vehicle according to claim 13, further comprising a road surface friction coefficient detecting means for detecting a road surface friction coefficient, wherein said threshold value of said time derivative of a steering torque is increased in accordance with an increase in said road surface friction coefficient.

15. A braking force control system in a vehicle according to claim 13, further comprising a vehicle speed detecting means for detecting a vehicle speed, wherein said threshold value of said time derivative of a steering torque is decreased in accordance with an increase in vehicle speed.

16. A braking force control system in a vehicle according to claim 8, wherein said actuator control means finishes control of said actuator when an amount of variation in direction of advancement of the vehicle reaches a threshold value.

17. A braking force control system in a vehicle according to claim 8, further comprising a road surface friction coefficient detecting means for detecting a road surface friction coefficient, wherein said braking forces applied to said wheels are increased in accordance with an increase in road surface friction coefficient.

18. A braking force control system in a vehicle according to claim 8, further comprising a vehicle speed detecting means for detecting a vehicle speed, wherein said braking forces are decreased in accordance with an increase in vehicle speed.

19. A braking force control system in a vehicle according to claim 8, further comprising
   an obstacle information detecting means for detecting an obstacle ahead of the vehicle in a direction of advancement thereof;
   an obstacle avoidance determining means for determining whether the obstacle is avoidable by changing a direction of advancement of the vehicle in response to braking forces applied by said wheel brakes based on a result of said detection by said obstacle information detecting means, wherein when said obstacle avoidance determining means determines that the obstacle cannot be avoided, said actuator control means controls said actuator to generate a braking force for reducing a vehicle speed.

20. A braking force control system in a vehicle including wheel brakes mounted on left and right wheels, respectively, an actuator capable of individually operating the wheel brake for the left wheel and the wheel brake for the right wheel, and an actuator control means capable of controlling the actuator independently from a braking operation conducted by a driver of the vehicle, wherein said braking force control system includes an urgent avoidance steering-operation detecting means for detecting an urgent avoidance steering-operation by the driver, and when the urgent avoidance steering-operation is detected, said actuator control means controls said actuator to generate a change in a direction of advancement of the vehicle to a direction of the steering operation by using braking forces of the wheels, said system further comprising an obstacle information detecting means for detecting an obstacle present ahead of the vehicle in a direction of advancement thereof, and an obstacle avoidance determining means for determining whether the obstacle can be avoided by the change in the direction of advancement of the vehicle by the braking forces of said wheel brakes based on a result of said detection by said obstacle information detecting means, whereby when said obstacle avoidance determining means determines that the obstacle can not be avoided, said actuator control means controls said actuator to generate a braking force for reducing the vehicle speed in addition to said braking forces for said change in the direction of advancement of the vehicle.

\* \* \* \* \*